US010754577B2

(12) United States Patent
Ekbote et al.

(10) Patent No.: US 10,754,577 B2
(45) Date of Patent: Aug. 25, 2020

(54) DYNAMIC FLOW CONTROL FOR TRANSFERRING DATA EFFICIENTLY AND EFFECTIVELY OVER NON-LINEAR BUFFERED NETWORK PATHS

(71) Applicant: VMware, Inc., Palo Alto, CA (US)

(72) Inventors: Siddharth Ekbote, Palo Alto, CA (US); Todd Sabin, Morganville, NJ (US); Serge Maskalik, Los Gatos, CA (US)

(73) Assignee: VMware, Inc., Palo Alto, CA (US)

( * ) Notice: Subject to any disclaimer, the term of this patent is extended or adjusted under 35 U.S.C. 154(b) by 150 days.

(21) Appl. No.: 15/701,387

(22) Filed: Sep. 11, 2017

(65) Prior Publication Data

US 2019/0079695 A1 Mar. 14, 2019

(51) Int. Cl.
*G06F 3/06* (2006.01)
*H04L 12/24* (2006.01)
*H04L 29/08* (2006.01)
*H04L 12/825* (2013.01)

(52) U.S. Cl.
CPC .......... *G06F 3/0656* (2013.01); *G06F 3/061* (2013.01); *G06F 3/067* (2013.01); *G06F 3/0647* (2013.01); *H04L 41/0896* (2013.01); *H04L 47/263* (2013.01); *H04L 67/06* (2013.01); *H04L 67/2842* (2013.01); *H04L 67/1097* (2013.01)

(58) Field of Classification Search
None
See application file for complete search history.

(56) References Cited

U.S. PATENT DOCUMENTS

| 8,098,677 B1* | 1/2012 | Pleshek | H04L 43/12 370/351 |
|---|---|---|---|
| 2013/0198424 A1* | 8/2013 | Randhawa | G06F 13/14 710/74 |
| 2014/0105019 A1* | 4/2014 | Harrang | H04L 47/22 370/235 |

* cited by examiner

*Primary Examiner* — Ayaz R Sheikh
*Assistant Examiner* — Sori A Aga
(74) *Attorney, Agent, or Firm* — Patterson + Sheridan, LLP

(57) ABSTRACT

A method of transferring data between local and remote computing systems includes the step of transferring data between the local and remote computing systems via a local buffer in the local computing system and a series of steps carried out during transferring of data from the local to the remote computing system. The steps include receiving a statistic from the remote computing system, computing an average transfer rate of the data transfer between the local and remote computing systems based on the statistic, determining whether or not a throttle condition is in effect based on the computed average transfer rate, and upon determining that the throttle condition is in effect, throttling the transferring of data into the local buffer.

20 Claims, 9 Drawing Sheets

DYNAMIC FLOW CONTROL FOR TRANSFERRING DATA EFFICIENTLY AND EFFECTIVELY OVER NON-LINEAR BUFFERED NETWORK PATHS

BACKGROUND

Cloud architectures are used in cloud computing and cloud storage systems for offering infrastructure-as-a-service (IaaS) cloud services. Examples of cloud architectures include the VMware vCloud Director® cloud architecture software, Amazon EC2™ web service, and OpenStack™ open source cloud computing service. IaaS cloud service is a type of cloud service that provides access to physical and/or virtual resources in a cloud environment. These services provide a tenant application programming interface (API) that supports operations for manipulating IaaS constructs, such as virtual machines (VMs) and logical networks.

Virtual machines running in host computers are actively managed to improve the overall performance of cloud services. One example is live migration of VMs from one cloud computing system to another cloud computing system. Live migration of a VM involves copying the memory pages of the VM from a source machine to a destination machine. VMs may undergo live cross-cloud migration from a busy server to an underutilized server to achieve load balancing across cloud computing systems. Live migration of VMs also may be carried out to enable machine maintenance.

Cross-cloud migration of VMs and other data is usually performed across a wide-area network (WAN), such as the Internet. To improve latency and throughput over the WAN, WAN optimizers are employed. On the sending side, WAN optimizers compress data and on the receiving side WAN optimizers decompress the data. WAN optimizers also perform deduplication. Because of compression and deduplication, the WAN optimizer on the receiving side often deals with more data than the WAN optimizer on the sending side. This can cause the data buffer of the receiving WAN optimizer to fill faster than the receiving WAN optimizer can free. When a receiving WAN optimizer's data buffer becomes full, it is not able to accept new data until it frees space in its buffer. During this time, no data is sent from the sending WAN optimizer to the receiving WAN optimizer. In addition, the WAN optimizer causes the buffering both on the local and remote side to exhibit a non-linearity in that a constant number of bytes in the buffers holds a variable number of data bytes at different points in time due to the compression and deduplication operations performed by the WAN optimizer. This non-linearity poses a problem for latency sensitive protocols.

Software performing cross-cloud migration of VMs or other data sometimes has a progress requirement to transfer a certain amount of data per unit of time. If the progress requirement is not met, then the migration software concludes that the migration cannot be completed at this time and aborts the migration process. When a receiving WAN optimizer's buffer fills and the WAN optimizer stops receiving data for a certain length of time, that length of time might be too long to satisfy the migrating software's progress requirement. This causes the migration to fail. Thus, there exists a need to control data flow from one cloud to another cloud, when utilizing WAN optimizers, to prevent aborts of data migration processes.

SUMMARY

Embodiments provide a method of transferring data between local and remote computing systems (e.g., cloud computing systems). The method includes the step of transferring data between the local and remote computing systems via a local buffer in the local computing system and a series of steps carried out during transferring of data from the local to the remote computing system. The steps include receiving a statistic from the remote computing system, computing an average transfer rate of the data transfer between the local and remote computing systems based on the statistic, determining whether or not a throttle condition is in effect based on the computed average transfer rate, and upon determining that the throttle condition is in effect, throttling the transferring of data into the local buffer.

Further embodiments include a non-transitory computer-readable storage medium comprising instructions that cause a computer system to carry out the above method, as well as a computer system configured to carry out the above method.

DETAILED DESCRIPTION

Figure 1:
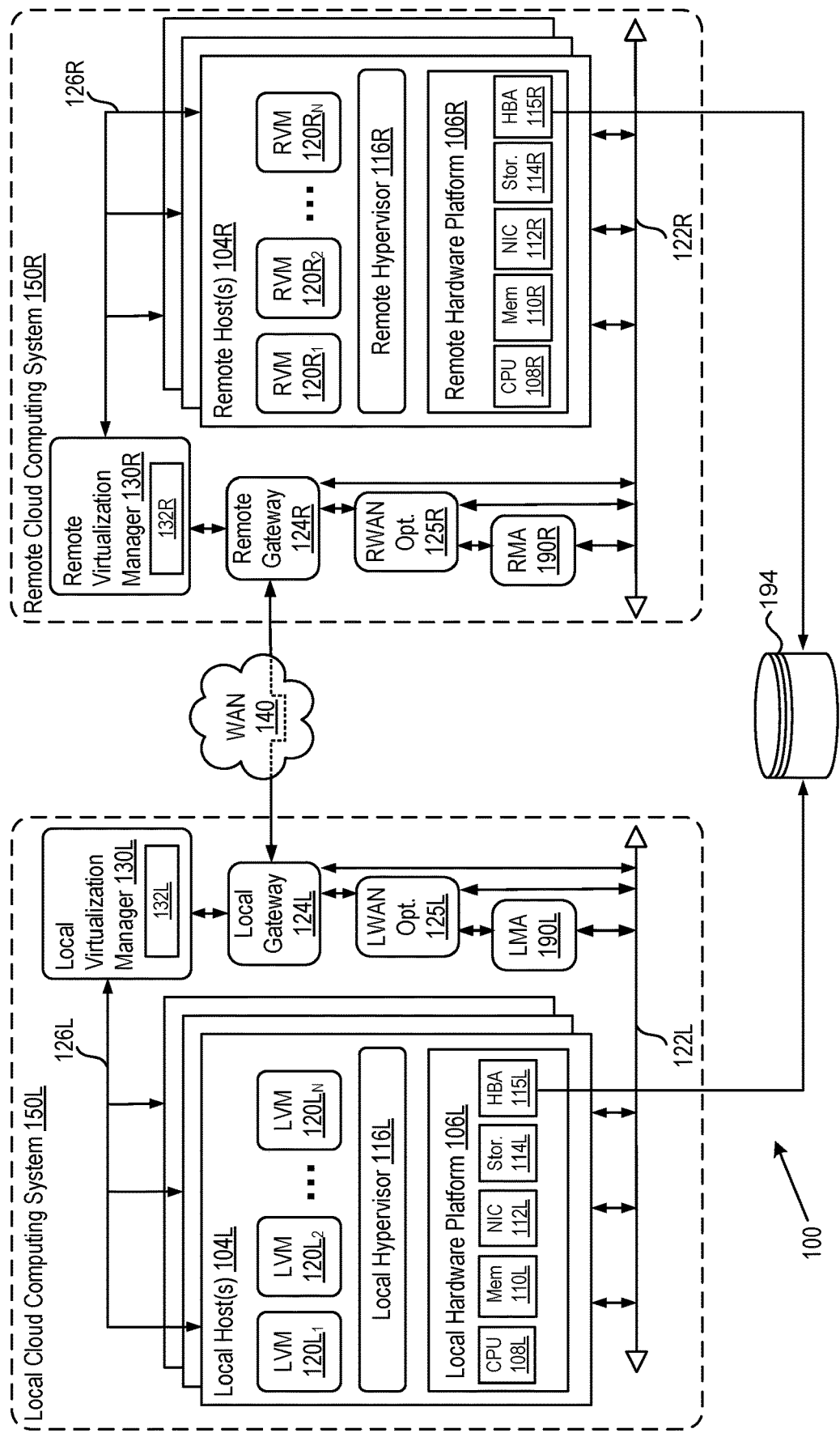
FIG. 1 depicts a block diagram of a cross-cloud cloud computing system in which one or more embodiments of the present disclosure may be utilized.

FIG. 1 depicts a block diagram of a cross-cloud cloud computing system 100 in which one or more embodiments of the present disclosure may be utilized. Cross-cloud computing system 100 includes a virtualized computing system implementing a local cloud computing system 150L and a virtualized computing system implementing a remote cloud computing system 150R. Cross-cloud computing system 100 is configured to provide a common platform for managing and executing virtual workloads seamlessly between local and remote cloud computing systems 150L, 150R. Local cloud computing system 150L is depicted substantially the same as remote cloud computing system 150R, with similar numbers representing same components. The "L" in the numbers stands for "local," and the "R" in the numbers stands for "remote."

FIG. 1 illustrates local and remote cloud computing systems 150L, 150R as private clouds. However, each may be either a private, public, or hybrid cloud. As used herein, an internal cloud or "private" cloud is a cloud in which a tenant and a cloud service provider are part of the same organization, while an external or "public" cloud is a cloud that is provided by an organization that is separate from a tenant that accesses the external cloud. A hybrid cloud is a cloud architecture in which a tenant is provided with seamless access to both private cloud resources and public cloud resources.

Local cloud computing system 150L includes one or more local host computer systems ("local hosts 104L"). Local hosts 104L may be constructed on a server grade local hardware platform 106L, such as an x86 architecture platform. As shown, local hardware platform 106L of each local host 104L may include conventional components of a computing device, such as one or more processors (CPUs) 108L, system memory 110L, a network interface 112L, storage system 114L, optionally a local host bus adapter (HBA) 115L, and other I/O devices such as, for example, a mouse and keyboard (not shown).

CPU 108L is configured to execute instructions, for example, executable instructions that perform one or more operations described herein and may be stored in memory 110L and in local storage.

Memory 110L stores information, such as executable instructions of programs, cryptographic keys, virtual disks, configurations, program data and other data, for access by the CPU. Memory 110L may include, for example, one or more random access memory (RAM) modules.

Network interface 112L enables local host 104L to communicate with another device via a communication medium, such as a local network 122L within local cloud computing system 150L. Network interface 112L may be one or more network adapters, also referred to as a Network Interface Card (NIC).

Storage system 114L represents local persistent storage devices (e.g., one or more hard disks, flash memory modules, solid state disks, and optical disks). Optional host bus adapter (HBA) couples local host 104L to one or more external storage 194, such as a storage area network (SAN) or a network-attached storage (NAS), as well as other network data storage systems. As depicted in FIG. 1, external storage 194 is shared between local cloud computing system 150L and remote cloud computing system 150R, such that both local HBA 115L and remote HBA 115R are coupled to external storage 194.

Each local host 104L is configured to provide a virtualization layer that abstracts processor, memory, storage, and networking resources of local hardware platform 106L into multiple local virtual machines $120L_1$ to $120L_N$ (collectively referred to as local VMs 120L) that run concurrently on the same hosts. Local VMs 120L run on top of a software interface layer, referred to herein as a local hypervisor 116L, that enables sharing of the hardware resources of local host 104L by local VMs 120L. One example of a local hypervisor 116 that may be used in an embodiment described herein is a VMware ESXi™ hypervisor provided as part of the VMware vSphere® solution made commercially available from VMware, Inc. of Palo Alto, Calif. Local hypervisor 116L may run on top of the operating system of local host 104L or directly on hardware components of local host 104L.

Local cloud computing system 150L includes a virtualization management component (depicted in FIG. 1 as local virtualization manager 130L) that communicates with the plurality of local hosts 104L via a network, sometimes referred to as a management network 126L. In one embodiment, local virtualization manager 130L is a computer program that resides and executes in a central server, which may reside in local cloud computing system 150L, or alternatively, running as a VM in one of local hosts 104L.

One example of a virtualization manager is the vCenter Server™ product made available from VMware, Inc. Virtualization manager 130 is configured to carry out administrative tasks for local cloud computing system 150L, including managing local hosts 104L, managing local VMs 120L running within each local host 104L, provisioning VMs, migrating VMs from one host to another host, and load balancing between local hosts 104L.

In one embodiment, local virtualization manager 130L includes a hybrid cloud management module (depicted as local hybrid cloud manager 132L configured to manage and integrate virtualized computing resources provided by remote cloud computing system 150R with virtualized computing resources of local cloud computing system 150L to form a unified computing platform. Local hybrid cloud manager 132L is configured to deploy VMs in remote cloud computing system 150R, transfer VMs from local cloud computing system 150L to remote cloud computing system 150R, and perform other "cross-cloud" administrative tasks. In one implementation, local hybrid cloud manager 132L is a module or plug-in complement to local virtualization manager 130L, although other implementations may be used, such as a separate computer program executing in a central server or running in a VM in one of local hosts 104L. One example of local hybrid cloud manager 132L is the VMware vCloud Connector® product made available from VMware, Inc.

In one embodiment, local hybrid cloud manager 132L is configured to control network traffic on local network 122L via a gateway component (depicted as a local gateway 124L). Local gateway 124L (e.g., executing as a virtual appliance) is configured to provide local VMs 120L and other components in local cloud computing system 150L with connectivity to an external wide area network (WAN) 140 (e.g., Internet). Local gateway 124L may manage external public IP addresses for local VMs 120L and route traffic incoming to and outgoing from local cloud computing system 150L and provide networking services, such as firewalls, network address translation (NAT), dynamic host configuration protocol (DHCP), and load balancing. Local gateway 124L may be configured to provide virtual private network (VPN) connectivity over WAN 140 with another VPN endpoint, such as a remote gateway 124R within remote cloud computing system 150R. While FIG. 1 depicts a single connection between local gateway 124L and remote gateway 124R for illustration purposes, it should be recognized that multiple connections between multiple local gateways 124L and remote gateways 124R may be used.

The Local Cloud computing system a local WAN optimizer 125L and remote WAN optimizer 125R for optimizing traffic over the WAN and in some embodiments encrypting the traffic over the WAN. For WAN optimization, any of the WAN optimization techniques disclosed in U.S. patent application Ser. No. 14/838,537, filed Aug. 28, 2015 and entitled "Data Center WAN Aggregation to Optimize Hybrid Cloud Connectivity," and U.S. patent application Ser. No. 14/838,572, filed Aug. 28, 2015 and entitled "Pre-Fetch Cache Population for WAN Optimization," that can reduce latency and improve throughput may be employed.

In one or more embodiments, remote cloud computing system 150R is configured substantially the same as local cloud computing system 150R with the same components, as depicted in FIG. 1. In other embodiments, remote cloud computing system 150R is configured differently from local cloud computing system 150L.

To facilitate cross-cloud VM migration, local cloud computing system 150L is configured with a local mobility agent (LMA) 190L and remote cloud computing system 150R is configured with a remote mobility agent (RMA) 190R. LMA and RMA 190L, 190R can be implemented using a VM in each respective cloud computing system 150L, 150R or implemented directly on a hardware computer system.

Figure 2A:
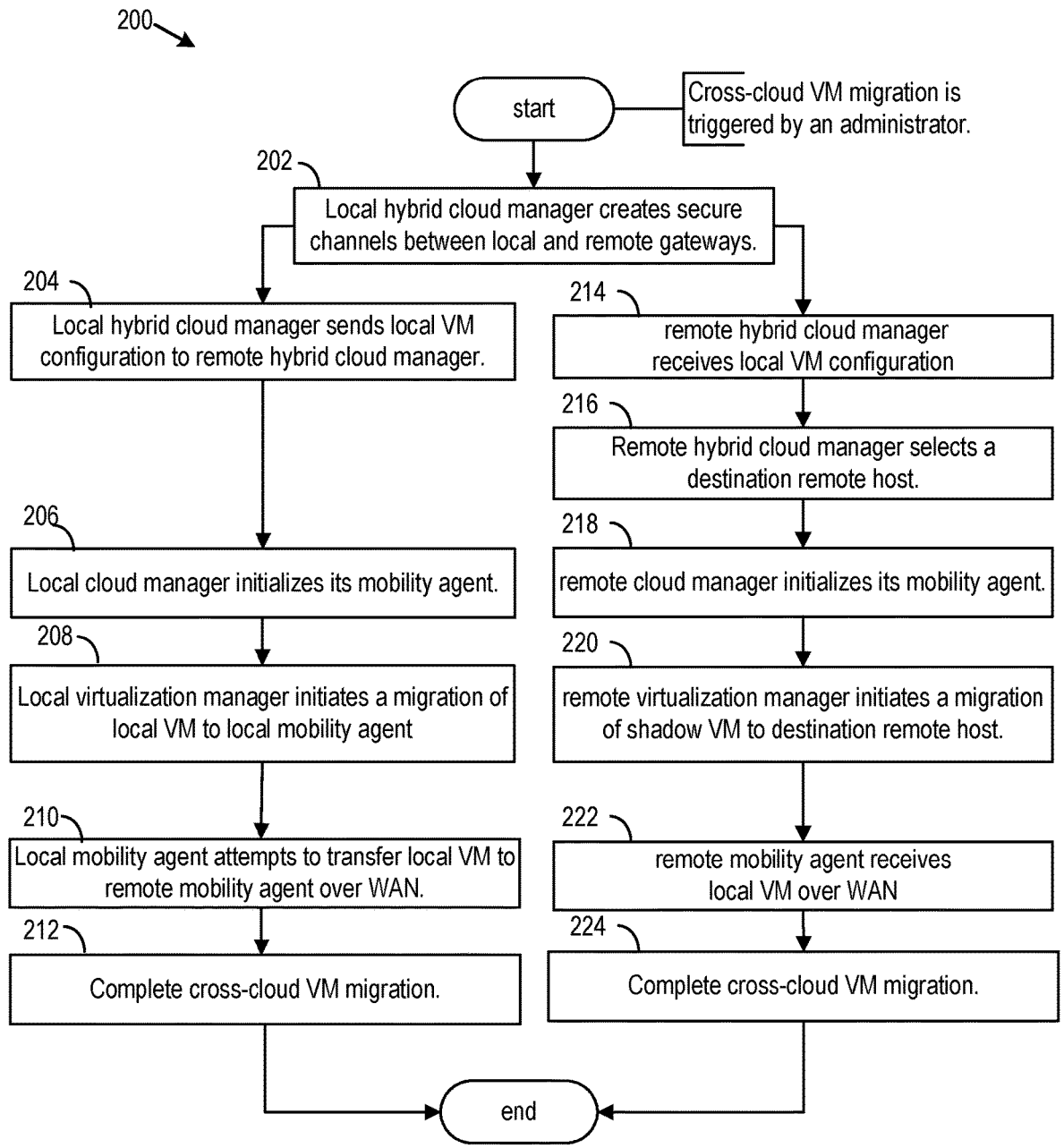
FIG. 2A depicts a flow diagram for cross-cloud migration of data, according to one or more embodiments.

FIG. 2A depicts a flow diagram for the cross-migration of data. The migrated data, which in this case is data for a virtual machine, follows a path from a source local host 104L to LMA 190L, then through the local WAN optimizer 125L, the local gateway 124L, over the WAN 140, to the remote gateway 124R, the remote WAN optimizer, to the RMA and finally to the destination remote host 104R. The cross-cloud migration of data is initiated by the local hybrid cloud manager 132L. Referring to the steps of FIG. 2, in step 202, the local cloud manager first creates secure channels via the WAN between the local and remote gateways.

In step 204, the local cloud manager sends local VM configuration data to the remote cloud manager. In step 214, the remote cloud manager receives the local VM configuration data and in step 216 the remote cloud manager selects a destination remote host to receive the migrated VM.

In step 206, the local cloud manager initializes its mobility agent and in step 216, the remote cloud manager initializes its mobility agent.

In step 208, the local virtualization manager initiates a migration of the local VM to the local mobility agent. In step 218, the remote virtualization manager initializes its local mobility agent. In step 220, the remote virtualization manager initiates a migration of a shadow VM to the destination remote host. The shadow VM 412R includes the same or a substantially similar configuration as the source VM being migrated so that the remote mobility agent 190R can mimic the source VM during the VM migration executing in remote cloud computing system 150R.

In step 210, the local mobility agent transfers the local VM to the remote mobility agent over the WAN and in step 222, the remote mobility agent receives the local VM over the WAN.

In step 212 and 224, both the local and remote systems complete the cross-cloud VM migration. If and when the transfer completes then local virtualization manager 130L can remove the migrated VM from its inventory, remote virtualization manager 130R can remove the remote shadow VM 412R from its inventory and can add the migration VM located on destination host 104R to its inventory.

Figure 2B:
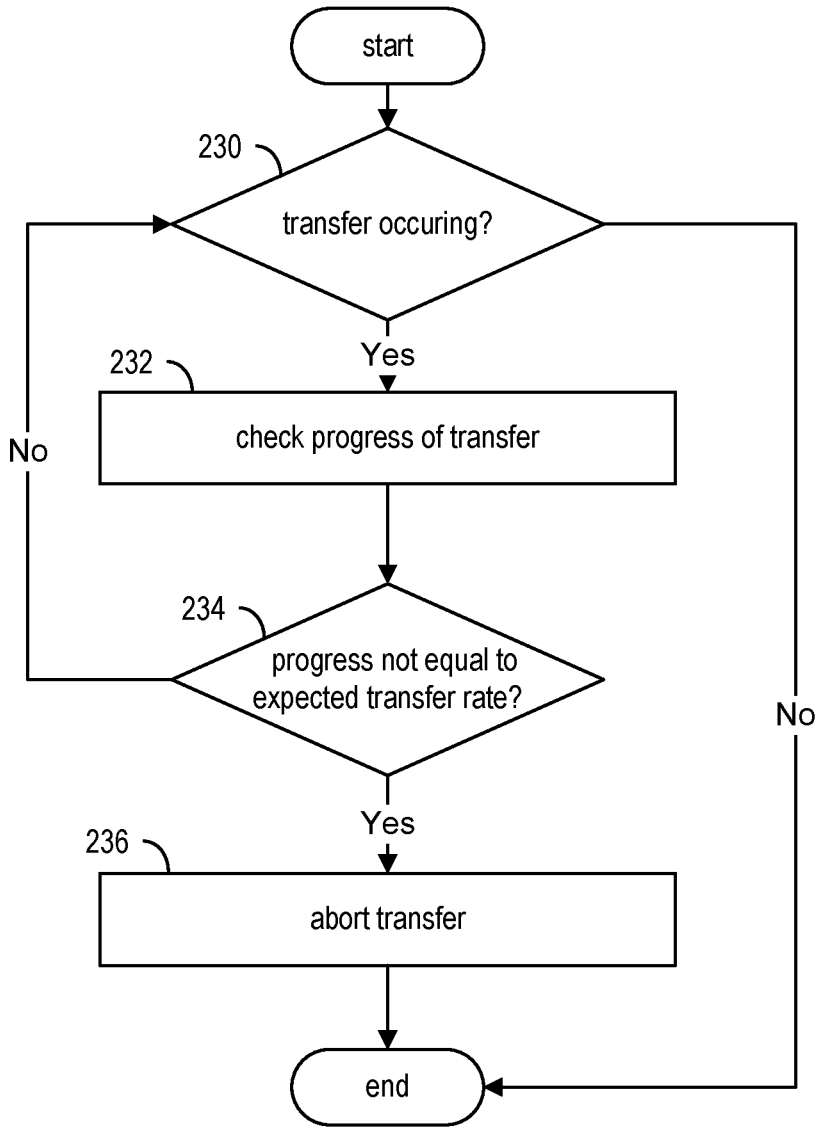
FIG. 2B depicts a flow diagram for monitoring the data transfer of FIG. 2A, according to one or more embodiments.

FIG. 2B depicts a flow diagram for monitoring the data transfer of FIG. 2A. In step 230, local virtualization manager 130L determines whether a transfer is occurring and if so, then in step 232 checks the progress of the transfer. In one embodiment, progress in the transfer is deemed to occur when data leaves local host 104L and reaches local mobility agent 190L. For example, if 1 MB of data is transferred every 20 second from local host 104L to local mobility agent 190L then the transfer is progressing. If the transfer is progressing as determined in step 234, then flow returns to step 230 to check that the transfer is still occurring and to step 232 to check its progress. If sufficient progress is not occurring, the transfer is aborted in step 236.

Figure 3A:
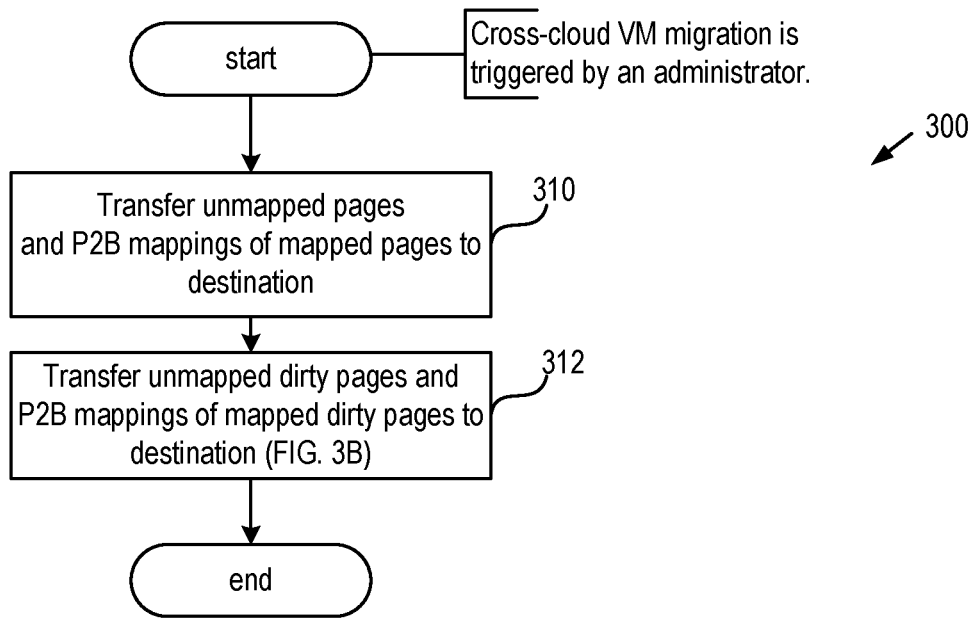
FIGS. 3A and 3B depict a flow diagram for cross-cloud live migration of a virtual machine, according to one or more embodiments.
Figure 3B:
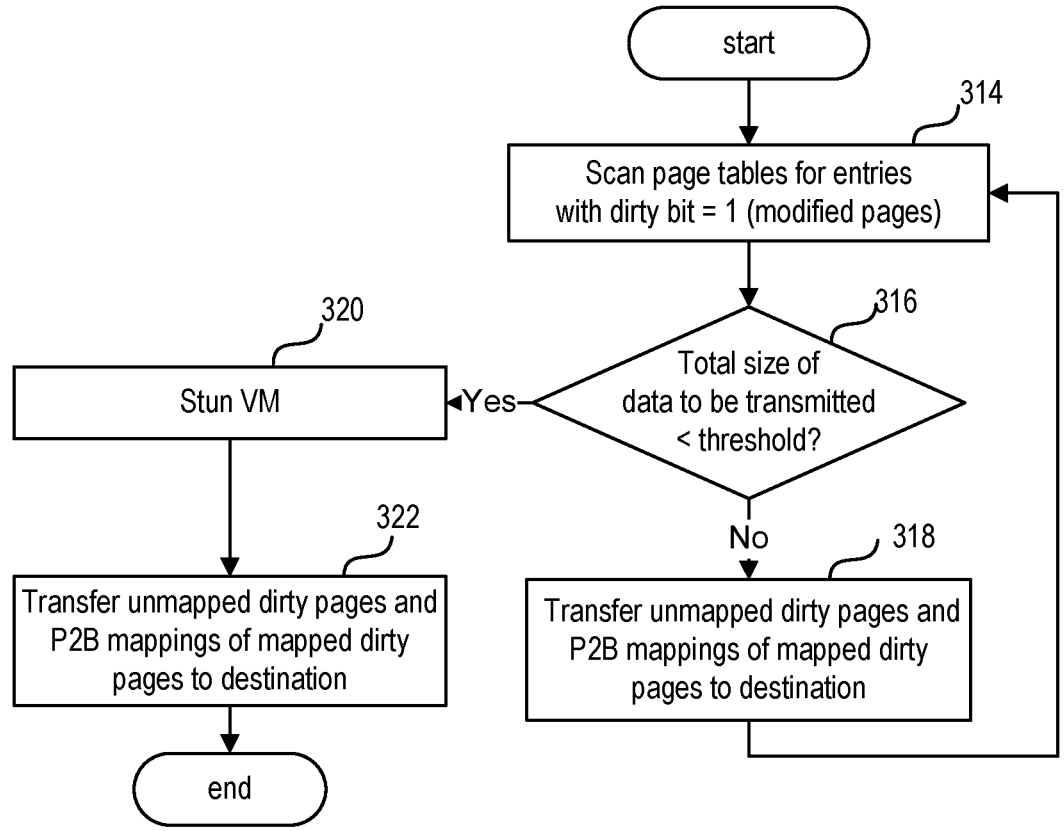

FIGS. 3A and 3B depict a flow diagram for cross-cloud live migration of a virtual machine. FIG. 3A depicts a flow diagram for the transfer with step 312 detailed in FIG. 3B. In step 310, unmapped pages and P2B mappings of mapped pages are transferred from the local cloud computing system 150L to the remote cloud system 150R. The P2B mappings are mappings for pages residing in storage. Instead of transferring the contents of these pages, only their mappings are transferred. In step 312, the unmapped dirty pages and P2B mappings of mapped dirty pages are transferred to the destination.

FIG. 3B depicts the detail of transferring the dirty pages to the destination. In step 314, the pages tables of the virtual machine are scanned to determine a set of pages having their dirty bit set. If the size of this set is greater than a given threshold as determined in step 316, then the unmapped dirty pages and the P2B mappings of mapped dirty pages are transferred to the destination in step 318, after which the page tables are scanned again in step 314, because the virtual machine being transferred continues to run and possibly create new dirty pages. The process repeats until the set of pages to be transferred is less than the given threshold, as determined in step 316. When the size is less than the given threshold, then in step 320, the virtual machine is "stunned" (i.e., stopped from executing) and the final set of unmapped dirty pages and P2B mappings of mapped dirty pages is transferred to the destination. At this point, all of the pages of the virtual machine have been transferred. One implementation of a live migration process applicable to steps 210 and 212 is provided in U.S. patent application Ser. No. 13/760,868, filed Feb. 6, 2013, the entire contents of which are incorporated by reference herein.

Figure 4:
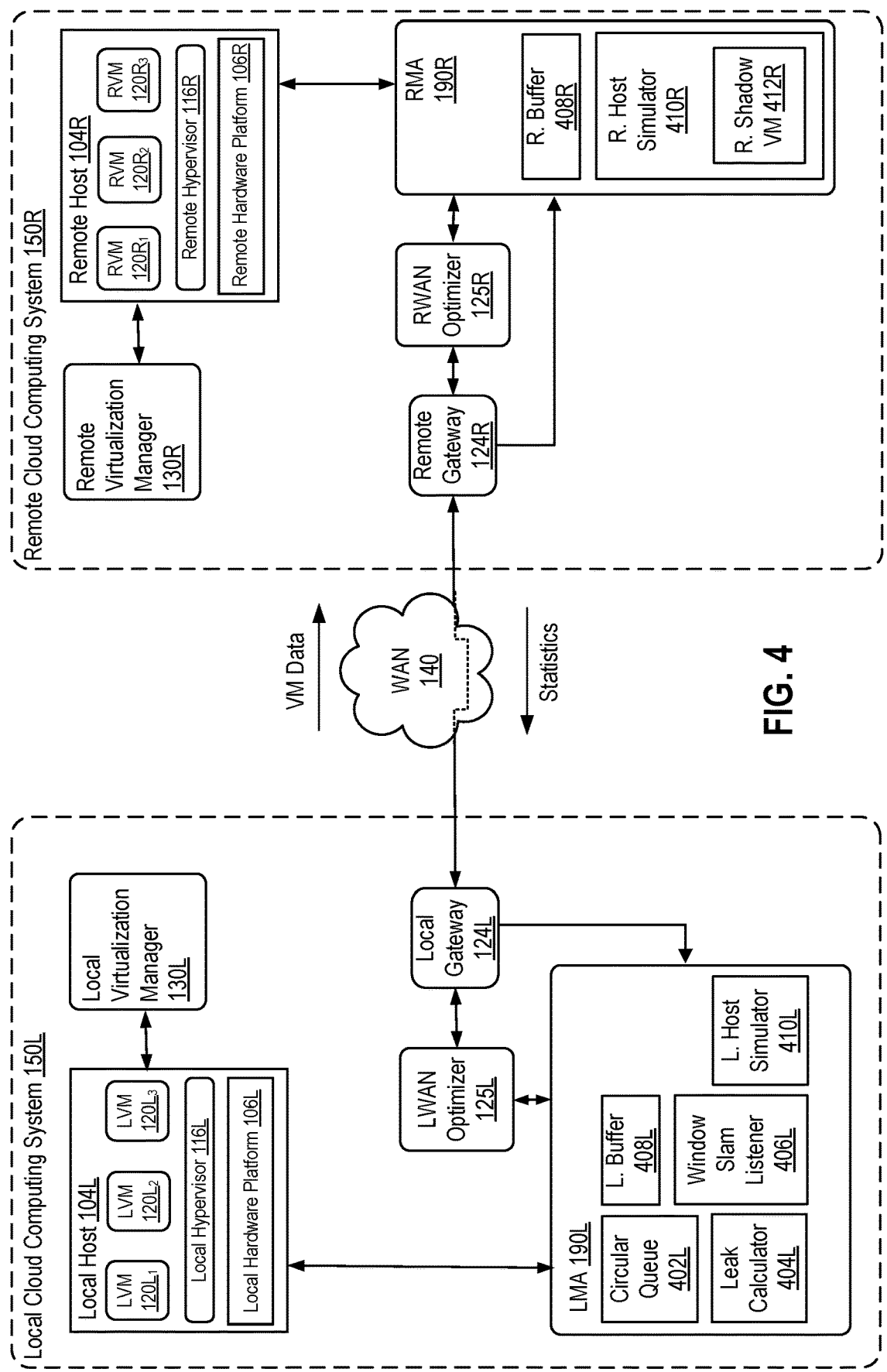
FIG. 4 is a block diagram showing logical connections and transfer paths among various components in cross-cloud computing system used during data migration, according to one or more embodiments.

FIG. 4 is a block diagram showing logical connections and transfer paths among various components in cross-cloud computing system 100 used during data migration, according to an embodiment. On the local side, FIG. 4 includes a representative local host 104L, local virtualization manager 130L, LMA 190L, LWAN optimizer 125L, and local gateway 124L. On the remote side, FIG. 4 includes remote virtualization manager 130R, representative remote host 104R, remote gateway 124R, RWAN optimizer 125R, and RMA 190R. LMA 190L on the local side includes a circular queue 402L, a local buffer 408L, a leak calculator 404L, a window slam (WS) listener 406L, and a local host simulator 410L. The RMA 190R includes a remote buffer 408R, a remote host simulator 410R and a remote shadow VM 412R.

Circular queue 402L, leak calculator 404L and window slam listener 406L each play a role in controlling the transfer of migration data so that the capacity of remote buffer 408R is not exceeded during the transfer. Thus, LMA 190L and RMA 190R operate to flow control the transfer.

Figure 5:
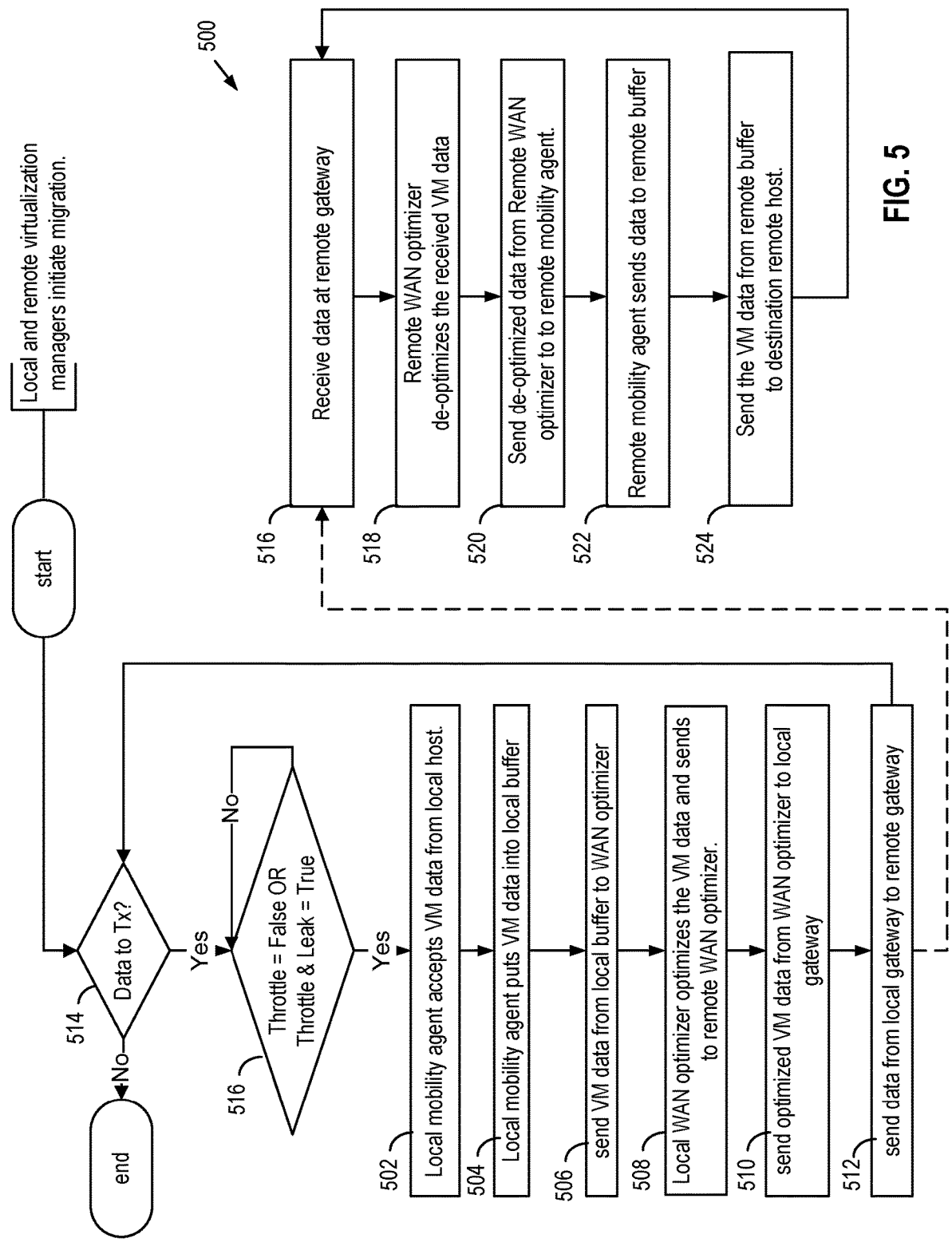
FIG. 5 depicts a flow diagram of the transfer of data in more detail, according to one or more embodiments.

FIG. 5 depicts a flow diagram of the transfer of data in more detail. If data is available to be transferred, as determined in step 514, and if a throttle flag is false or a leak flag is true, as determined in step 516, the transfer proceeds. The throttle flag, if true, prevents the transfer from proceeding and the leak flag, if true, permit a small amount of data transfer while the throttle flag is true. Throttle flag and leak flag control is set out in FIG. 7. When the migration is initiated, a socket is opened between local host 104L and local host simulator 410L of local mobility agent 190L.

In step 502, LMA 190L begins reading VM data from the socket between the local host 104L and LMA 190L, i.e., LMA 190L accepts VM data from local host 104L. While reading VM data from the socket LMA 190L keeps track of the total amount of data that it has accepted from local host 104L. In step 504, LMA 190L puts the VM data into local buffer 408L and in step 506 sends the VM data in local buffer 408L to local WAN optimizer 125L. In step 508, local WAN optimizer 125L optimizes the VM data (by de-duplicating and/or compressing the data) and sends the data to the remote WAN optimizer 125R via the established channels over the WAN 140. In step 510, the WAN optimizer 125R sends the optimized data to local gateway 124L from which the data is sent to remote gateway 124R.

On the remote side, in step 516, remote gateway 124R receives the optimized data sent over WAN 140. In step 518, remote WAN optimizer 125R de-optimizes the received data (by de-compressing) and in step 520 sends the de-optimized data to RMA 190R. Upon receipt of the data, RMA 190R sends the data to remote buffer 408R and from remote buffer 408R to destination remote host 104R. To prevent the data buffer of remote WAN optimizer from overrunning the transfer is throttled in accordance with FIG. 6.

Figure 6:
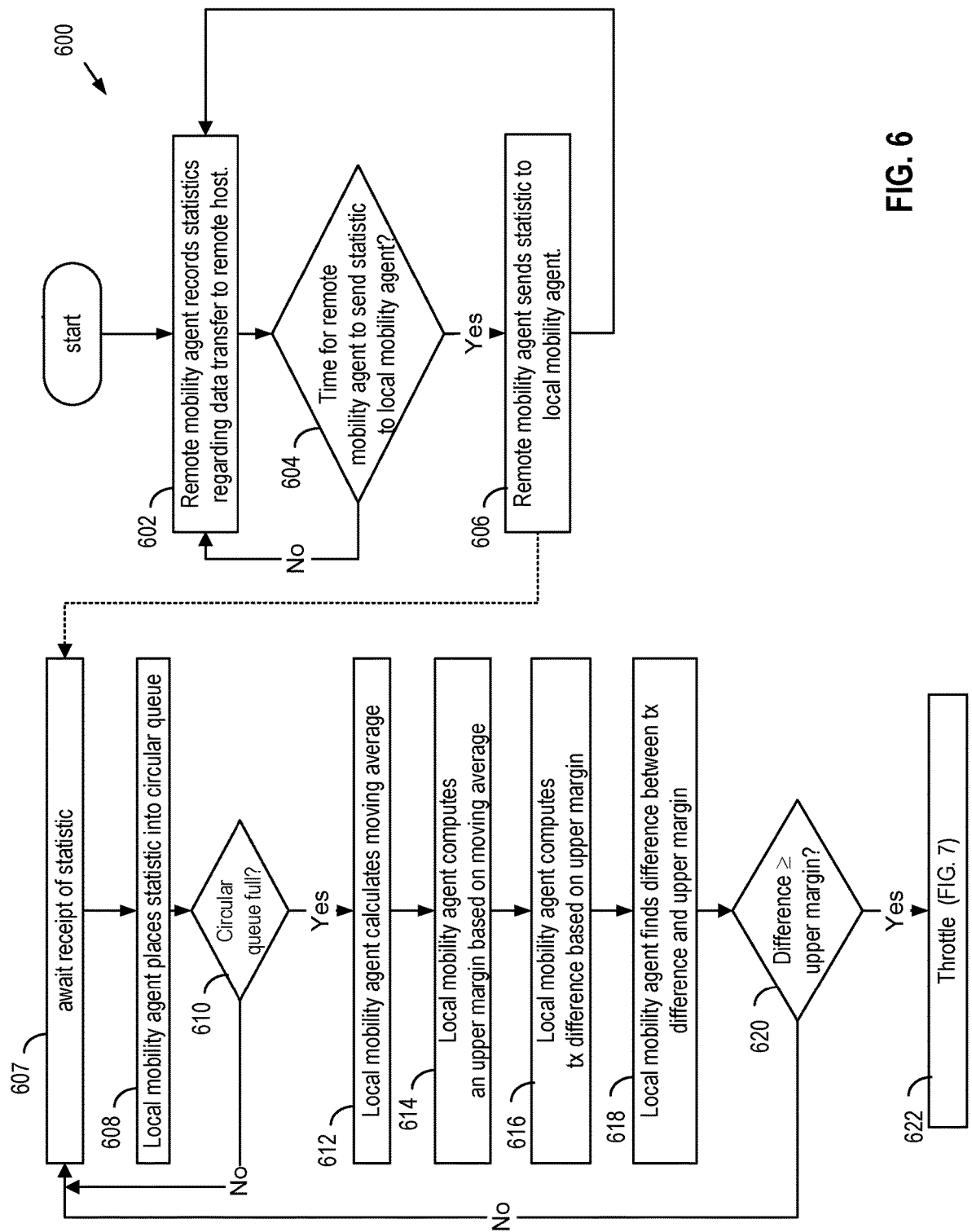
FIG. 6 depicts a flow diagram for determining whether to maintain throttling of cross-cloud migration of data, according to one or more embodiments.

FIG. 6 depicts a flow diagram for determining whether to throttle the cross-cloud migration of data. During the transfer, RMA 190R records in step 602 statistics regarding the data transfer, such as the data that it has transferred to remote host 104R. In step 604, the RMA 190R determines whether a certain amount of time has elapsed such that a transfer of a statistic to LMA 190L is needed. This time is called a "feedback epoch." The length of a feedback epoch can be 1, 2, 5, 10 or 25 seconds for example. If a feedback epoch has elapsed, then, in step 606, RMA 190R transfers the statistic to LMA 190L. In one embodiment, statistic is a tuple that includes (1) the data transfer rate from RMA 190R to remote host 104R at the time of sending and (2) the total amount of data that has been transferred from RMA 190R to remote host 104R. For example, a statistic (5, 100) represents a rate of 5 Gigabits per second and 100 Gigabits transferred. The count for the total amount of data that has been transferred from RMA 190R to remote host 104R beings at the time that remote virtualization manager 130R initiated migration of remote shadow VM 412R to destination remote host 104R as per step 220 of FIG. 2. Transfer of the statistic, such as (5, 100), initiates steps 608-620 in FIG. 6.

In step 607, LMA 190L determines that it has received a statistic from the RMA 190R. In step 608, LMA 190L places the received statistic into circular queue 402L in LMA 190L. In step 610, LMA 190L determines whether circular queue 402L is full, i.e., whether it has accumulated enough statistics to fill all of its entries, where the number of entries is a pre-configurable number. In some embodiments, circular queue 402L has 2, 5, 10 or 15 entries. When circular queue 402L becomes full, it has sufficient data to perform a moving average transfer rate calculation. Thus, if circular queue 402L has five entries, then in step 612, LMA 190L calculates the average transfer rate over those five entries. If, when full, circular queue 402L receives a new entry, the new entry overwrites the last entry of the queue and a new average (i.e., a moving average) is computed on the current five entries. If circular queue 402L is not full, flow returns to step 607 to await more entries.

In step 614, LMA 190L computes an upper margin based on the moving average. In one embodiment, the upper margin is equal to the product of a time_delta and the moving average (Equation 1), where the time_delta is a pre-configurable variable and can be modified by window slam listener 406L according to FIG. 8.

$$\text{Upper Margin} = \text{time\_delta} * \text{moving average} \quad (1)$$

The upper margin gives a measure of an amount of data that can be moved in the time_delta given the moving average transfer rate. For example, if the time_delta is 5 seconds and the moving average transfer rate is 10 Gigabits per second, then the upper margin is 50 Gigabits.

In step 616, LMA 190L computes a tx_difference based on the upper margin. In one embodiment, the tx_difference is equal to the difference between the amount of data transferred from local host 104L to LMA 190L and the amount of data transferred from RMA 190R to remote host 104R and thus give a measure of how much data is en route between the cloud computing systems. The data that is en route is assumed to be within the data buffer of remote WAN optimizer 125R.

In step 618, LMA 190L computes the difference between the tx_difference and the upper margin. This difference gives an indication of whether the tx_difference can be transferred in the time_delta. For example, if the upper margin is 50 Gigabits and the amount of data en route is 10 Gigabits, then the tx_difference amount of data can be transferred in less than 5 seconds at the current moving average transfer rate. Thus, if in step 620, LMA 190L determines that the difference is less than the upper margin, then the flow goes back to 607 to await the next statistic.

However, if the difference computed in step 618 is greater than or equal to the upper margin, as determined in step 620, then there is too much data en route (tx_difference is too high causing remote WAN optimizer 125R to stop accepting data) and a throttle process is engaged to protect the data buffer of remote WAN optimizer from becoming full. If the data buffer of WAN optimizer 125R becomes full, then local buffer 408L may also become full, causing transfers to not progress, possibly leading to aborting the migration.

Figure 7:
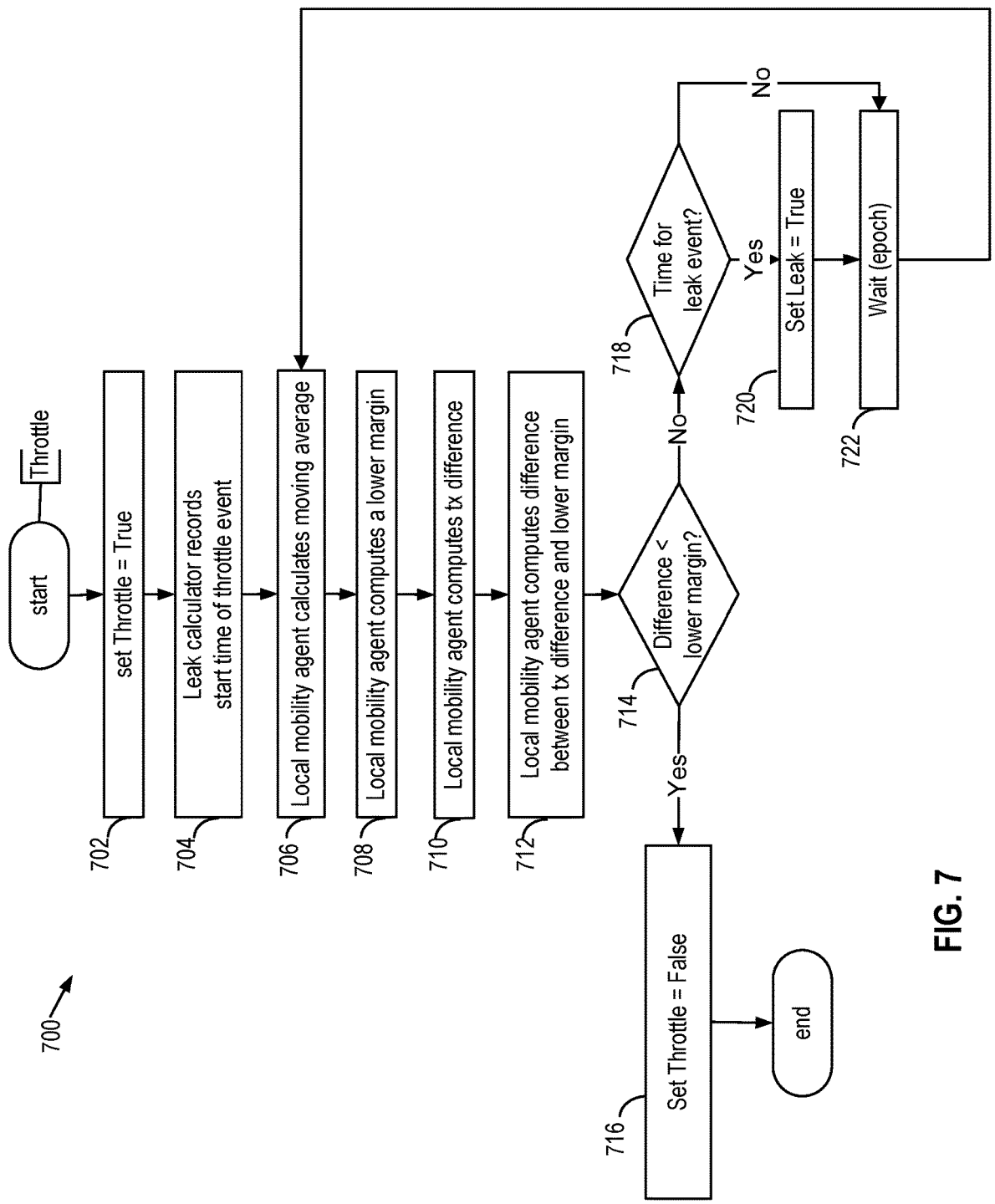
FIG. 7 depicts a flow diagram for throttling, according to one or more embodiments.

FIG. 7 depicts a flow diagram for throttling. If LMA 190L decides based on the received statistics that throttling is needed to prevent the data buffer of remote WAN optimizer from becoming full, then, in step 702, LMA 190L sets the throttling flag to true. As described in FIG. 5, this prevents LMA 190L from accepting VM data from local host 104L, thereby reducing the amount of data en route between the cloud computing systems.

Steps 704-712 and 714-722 of FIG. 7 depict the throttling process, during which transfers are stopped except for relatively small bursts of data transferred by leak events. Specifically, in step 704, leak calculator 404L records the start time of the throttling. In step 706, LMA 190L calculates a moving average based on the entries in circular queue 402L. In step 708, LMA 190L computes a lower margin. In one embodiment, the lower margin equals the product of one-half of the time_delta and the moving average (Equation 2).

$$\text{Lower Margin} = \frac{\text{time\_delta}}{2} * \text{moving average} \quad (2)$$

In step 710, LMA 190L computes a current tx_difference, where the tx_difference is the difference between the amount of data transferred from local host 104L to LMA 190L and the amount of data transferred from RMA 190R to remote host 104R, thus indicating a current amount of data that is en route from local host 104L to remote host 104R.

In step 712, LMA 190L computes the difference between the tx_difference and the lower margin. If, as determined in step 714, the difference is less than the lower margin, the throttling is stopped by setting the throttle flag false in step 716. Not enough data is en route to warrant a throttling operation, given the moving average transfer rate. If however, the difference is not less than the lower margin, then throttling continues.

As mentioned, while throttling is in effect, data is sent in relatively short bursts controlled by the leak operation to satisfy the progress requirement depicted in FIG. 2B.

Continuing with FIG. 7, if, as determined in step 714, throttling is in effect, then in step 718, the time for a leak event is determined. This time is calculated by leak calculator 404L, which can use a variety of formulas to determine whether it is time for a leak event. For example, in one embodiment, leak calculator 404L has a configurable parameter, called a "leak unit", of 256 KB which sets how much data is transferred between local host 104L and LMA 190L during a leak event. Leak calculator 404L also calculates the frequency of leaks so as to increase exponentially throughout the duration of the throttling. For example, in one embodiment, a leak event first occurs at 8 seconds, then at 12 seconds, then at 14 seconds and then at 15, 16, 17, 18 and 19 seconds, for a total of 8 leaks in 20 seconds, after the beginning of the throttle event. This results in a total transfer of 8*256=2 MB during the throttling, which is sufficient to maintain the progress requirement.

Thus, if it is time for a leak event, then in step 720, the leak flag is set true and in accordance with steps 516 and 502 of FIG. 5, a data transfer occurs from local host 104L to local buffer 408L. In step 722, a wait for feedback epoch time occurs, following which the flow returns to step 706 to calculate a new moving average based on the current contents of circular queue 402L. If during steps 706-714, LMA 190L determines that throttling has reduced the amount of data en route, then throttling stops in step 716. Otherwise, throttling continues.

As local buffer 408L is needed to perform leak events during throttling, it is important that local buffer 408L not become full. To avoid this condition, local buffer 408L is monitored by WS listener 106L.

Figure 8:
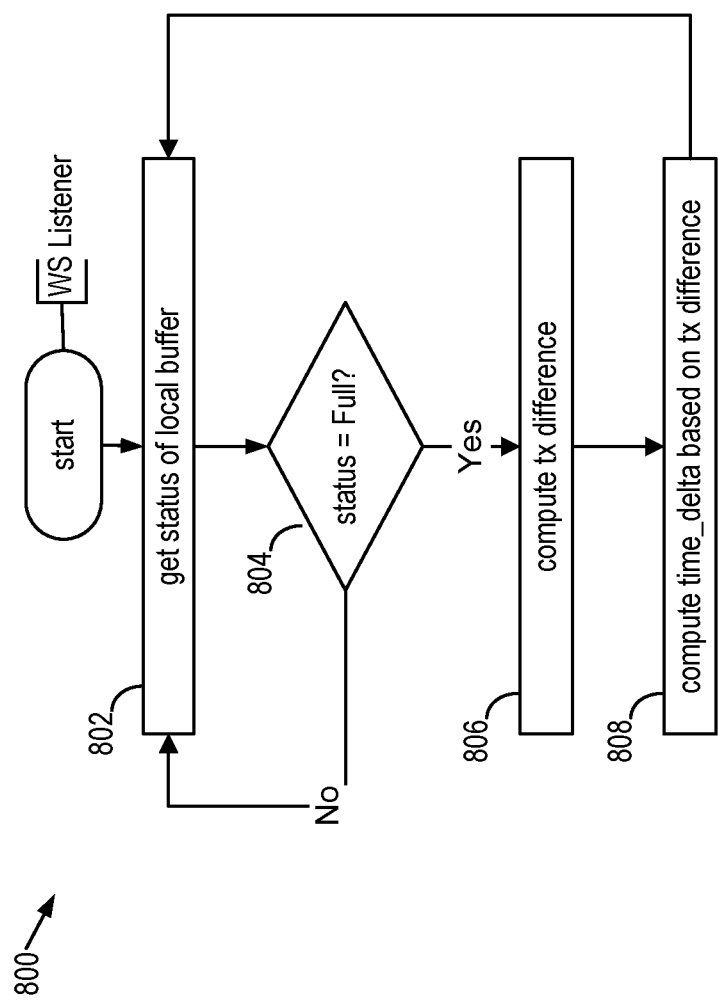
FIG. 8 depicts flow diagram for monitoring local buffer, according to one or more embodiments.

FIG. 8 depicts flow diagram for monitoring local buffer 408L by WS listener 106L. In step 802, WS listener 106L obtains the status of local buffer 408L. If, as determined in step 804, the status indicates that local buffer 408L is full, then WS listener 106L computes a tx_difference, where the tx_difference is the current difference between the amount of data transferred from local host 104L to the LMA 190L and the amount of data transferred from RMA 190R to remote host 104R. In step 808, a new time_delta is computed based on the tx_difference. In one embodiment, the new time_delta is the tx_difference divided by the moving average (Equation 3).

$$\text{time\_delta} = \frac{\text{difference}}{\text{moving average}} \qquad (3)$$

The new time_delta is reduced if the tx_difference has been reduced due to the throttling. This reduces the upper margin and thus encourages or maintains throttling, which prevents local buffer 408L from becoming full.

Thus, the various embodiments described above operate to regulate the transfer of data between the local and remote computing systems by receiving a statistic from the remote computing system, computing an average transfer rate of the data transfer, and determining whether or not to throttle the data transfer. This operates to, in effect, linearize the effect of the non-linear buffering in the data path between the local and remote computing systems, prevent buffers in the data path from becoming full, and maintain a minimum transfer rate between the local and remote computing systems that avoids having to abort and re-start the transfer.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). OS-less containers implement operating system—level virtualization, wherein an abstraction layer is provided on top of the kernel of an operating system on a host computer. The abstraction layer supports multiple OS-less containers each including an application and its dependencies. Each OS-less container runs as an isolated process in userspace on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O. The term "virtualized computing instance" as used herein is meant to encompass both VMs and OS-less containers.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

What is claimed is:

1. A method of transferring data between local and remote computing systems, comprising:
    transferring data between the local and remote computing systems via a local buffer in the local computing system, the transferring, comprising:
        transferring the data from a local host of the local computing system to a local mobility agent of the local computing system, wherein the local mobility agent includes the local buffer;
        transferring the data from the local mobility agent to a remote mobility agent of the remote computing system; and
        transferring the data from the remote mobility agent to a remote host of the remote computing system; and
    during the transferring of the data from the local to the remote computing system,
        receiving, at the local computing system, at least one statistic from the remote computing system, the at least one statistic indicating one or more of (i) a data transfer rate between the remote mobility agent and the remote host or (ii) an amount of data transferred between the remote mobility agent and the remote host,
        determining whether or not a throttle condition is in effect based on the at least one statistic and an amount of data transferred between the local host and the local mobility agent; and
        upon determining that the throttle condition is in effect, throttling the transferring of data from the local host into the local buffer.

2. The method of claim 1, wherein said throttling includes:
    stopping the transferring of data into the local buffer, except for short bursts of data.

3. The method of claim 2, wherein the short bursts of data are transferred periodically.

4. The method of claim 3, wherein the short bursts of data are transferred at a frequency that is determined based on a duration of the throttle condition.

5. The method of claim 1, wherein transferring the data between the local mobility agent and the remote mobility agent further includes:
    transferring data from the local buffer to an optimizer;
    transferring the data from the optimizer to a local gateway; and
    transferring the data from the local gateway to a remote gateway of the remote computing system over a wide area network.

6. The method of claim 1, wherein the throttle condition is determined to be in effect by:
    computing, based on the at least one statistic and the amount of data transferred between the local host and the local mobility agent, an amount of data in transit between the local and remote cloud computing systems; and
    determining that the amount of data in transit is greater than an upper margin which is computed based on an average transfer rate computed based on the at least one statistic.

7. The method of claim 6, wherein the throttle condition remains in effect until the amount of data in transit is less than a lower margin.

8. The method of claim 7, further comprising:
    upon determining that the local buffer is full, re-computing the upper margin.

9. A non-transitory computer-readable storage medium comprising instructions, which when executed by a computer system causes the computer system to carry out the steps of:
    transferring data between local and remote computing systems via a local buffer in the local computing system, the transferring, comprising:
        transferring the data from a local host of the local computing system to a local mobility agent of the local computing system, wherein the local mobility agent includes the local buffer;
        transferring the data from the local mobility agent to a remote mobility agent of the remote computing system; and
        transferring the data from the remote mobility agent to a remote host of the remote computing system; and
    during the transferring of the data from the local to the remote computing system,
        receiving, at the local computing system, at least one statistic from the remote computing system, the at least one statistic indicating one or more of (i) a data transfer rate between the remote mobility agent and the remote host or (ii) an amount of data transferred between the remote mobility agent and the remote host, determining whether or not a throttle condition is in effect based on the at least one statistic and an amount of data transferred between the local host and the local mobility agent; and upon determining that the throttle condition is in effect, throttling the transferring of data from the local host into the local buffer.

10. The non-transitory computer-readable storage medium of claim 9, wherein said throttling includes:

stopping the transferring of data into the local buffer, except for short bursts of data.

11. The non-transitory computer-readable storage medium of claim 10, wherein the short bursts of data are transferred periodically.

12. The non-transitory computer-readable storage medium of claim 11, wherein the short bursts of data are transferred at a frequency that is determined based on a duration of the throttle condition.

13. The non-transitory computer-readable storage medium of claim 9, wherein the throttle condition is determined to be in effect by:

computing, based on the at least one statistic and the amount of data transferred between the local host and the local mobility agent, an amount of data in transit between the local and remote cloud computing systems; and determining that the amount of data in transit is greater than an upper margin which is computed based on an average transfer rate computed based on the at least one statistic.

14. The non-transitory computer-readable storage medium of claim 13, wherein the throttle condition remains in effect until the amount of data in transit is less than a lower margin.

15. The non-transitory computer-readable storage medium of claim 14, further comprising:

upon determining that the local buffer is full, re-computing the upper margin.

16. A computer system comprising a local computing system connected to a remote computing system over a wide area network, wherein said local computing system includes a local buffer and is configured to:

transfer data to the remote computing system via the local buffer, the transfer comprising:

a transfer of data from a local host of the local computing system to a local mobility agent of the local computing system, wherein the local mobility agent includes the local buffer;

a transfer of data from the local mobility agent to a remote mobility agent of the remote computing system; and a transfer of data from the remote mobility agent to a remote host of the remote computing system; and during the transferring of the data from the local to the remote computing system, receive at the local computing system, the at least one statistic indicating one or more of (i) a data transfer rate between the remote mobility agent and the remote host or (ii) an amount of data transferred between the remote mobility agent and the remote host, determining whether or not a throttle condition is in effect based on the at least one statistic and an amount of data transferred between the local host and the local mobility agent; and upon determining that the throttle condition is in effect, throttling the transferring of data from the local host into the local buffer.

17. The computer system of claim 16, wherein the transfer of the data from the local mobility agent to the remote mobility agent via the local buffer includes:

transferring data from the local buffer to an optimizer;

transferring the data from the optimizer to a local gateway; and transferring the data from the local gateway to a remote gateway of the remote computing system over the wide area network.

18. The computer system of claim 16, wherein the throttle condition is determined to be in effect by:

computing, based on the at least one statistic and the amount of data transferred between the local host and the local mobility agent, an amount of data in transit between the local and remote cloud computing systems; and determining that the amount of data in transit is greater than an upper margin which is computed based on an average transfer rate computed based on the at least one statistic.

19. The computer system of claim 18, wherein the throttle condition remains in effect until the amount of data in transit is less than a lower margin.

20. The computer system of claim 16, wherein the local computing system is further configured to:

upon determining that the local buffer is full, re-compute the upper margin.

* * * * *